(12) United States Patent
McDonald (10) Patent No.: US 12,509,232 B2
(45) Date of Patent: Dec. 30, 2025

(54) AIRCRAFT EVACUATION SLIDES

(71) Applicant: The Boeing Company, Arlington, VA (US)

(72) Inventor: Steven Philip McDonald, Marysville, WA (US)

(73) Assignee: The Boeing Company, Arlington, VA (US)

( * ) Notice: Subject to any disclaimer, the term of this patent is extended or adjusted under 35 U.S.C. 154(b) by 149 days.

(21) Appl. No.: 18/474,987

(22) Filed: Sep. 26, 2023

(65) Prior Publication Data

US 2025/0100696 A1    Mar. 27, 2025

(51) Int. Cl.
  *B64D 25/14*    (2006.01)
  *B64C 3/18*     (2006.01)
(52) U.S. Cl.
  CPC ............... *B64D 25/14* (2013.01); *B64C 3/18* (2013.01)
(58) Field of Classification Search
  CPC ....................................................... B64D 25/14
  See application file for complete search history.

(56) References Cited

U.S. PATENT DOCUMENTS

| | | | |
|---|---|---|---|
| 4,333,546 A | 6/1982 | Fisher | |
| 6,443,259 B1 | 9/2002 | Oney et al. | |
| 7,641,149 B2 * | 1/2010 | McDonald | B64D 25/14 244/905 |
| 11,192,658 B2 * | 12/2021 | Haynes | B64D 25/14 |
| 11,492,129 B2 * | 11/2022 | Haynes | B64D 45/00 |
| 11,511,871 B2 * | 11/2022 | Haynes | B63B 7/085 |
| 11,618,578 B2 | 4/2023 | Lenaburg et al. | |
| 2008/0191097 A1 | 8/2008 | McDonald et al. | |
| 2021/0086870 A1 | 3/2021 | Haynes et al. | |
| 2021/0221524 A1 | 7/2021 | Haynes et al. | |
| 2021/0221525 A1 | 7/2021 | Haynes et al. | |

OTHER PUBLICATIONS

European Patent Office, "Extended European Search Report," issued in connection with European Patent Application No. 24200219.4-1004, mailed on Feb. 17, 2025, 8 pages.

* cited by examiner

*Primary Examiner* — William R Harp
(74) *Attorney, Agent, or Firm* — Hanley, Flight & Zimmerman, LLC (57) ABSTRACT

Example aircraft and aircraft evacuation slides and related methods are disclosed herein. An example evacuation slide assembly for an aircraft disclosed herein includes an inflatable slide body attachable to the aircraft and configured to inflate in response to an evacuation event, and a readiness indicator gate supported by the inflatable slide body, wherein the readiness indicator gate is movable from an unready position during inflation of the inflatable slide body, thereby indicating the inflatable slide body is not ready for use, to a ready position thereby indicating readiness of the inflatable slide body for user egress from the aircraft onto the inflatable slide body.

18 Claims, 5 Drawing Sheets

AIRCRAFT EVACUATION SLIDES

FIELD OF THE DISCLOSURE

This disclosure relates generally to aircraft and, more particularly, to aircraft evacuation slides.

BACKGROUND

Commercial passenger aircraft typically include evacuation slides to provide a quick exit from the aircraft. Evacuation slides are typically positioned at the doors and/or wings of the aircraft and are configured based on the type of aircraft.

SUMMARY

Example aircraft and aircraft evacuation slides and related methods are disclosed herein. An example evacuation slide assembly for an aircraft disclosed herein includes an inflatable slide body attachable to the aircraft and configured to inflate in response to an evacuation event, and a readiness indicator gate supported by the inflatable slide body, wherein the readiness indicator gate is movable from an unready position during inflation of the inflatable slide body, thereby indicating the inflatable slide body is not ready for use, to a ready position thereby indicating readiness of the inflatable slide body for user egress from the aircraft onto the inflatable slide body.

An example evacuation slide assembly for an aircraft disclosed herein includes an inflatable platform section, an inflatable slide section coupled to the inflatable platform section, a readiness indicator gate coupled to the inflatable platform section, and an anchor release coupled to the readiness indicator gate and configured to cause the readiness indicator gate to move from an unready position to a ready position in response to inflation of the inflatable slide section.

An example aircraft disclosed herein includes a fuselage having at least one exit door, a wing attached to the fuselage, a truss coupled to the wing and the fuselage, and an inflatable slide assembly attached to the fuselage and comprising a readiness indicator, wherein the inflatable slide assembly is deployable above the truss and below the at least one exit door.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Commercial passenger aircraft typically include an evacuation system having an inflatable slide for use with service doors, passenger entry doors, and/or over-the-wing exit doors. When activated, the slide unfolds and inflates using, for example, one or more reservoirs of pressurized gas.

Some exits, for example over-the-wing or other mid-cabin exit doors, may be passenger-operated exits during evacuation of the aircraft. In the configuration of an over-the-wing exit, the wing surface provides a platform for the evacuee (e.g., passenger or airline employee) to make a first step outside the fuselage and allows for an assessment of whether the evacuation pathway and slide are available for use. In a transonic aircraft with a truss-braced wing, the mid-cabin exit is above a wing truss, which is not suitable for use as a step.

In examples disclosed herein, an evacuation slide includes an inflatable platform that deploys from the fuselage and provides a stable horizontal surface for the evacuee to step onto when exiting the aircraft. In these examples, the platform and slide are to be fully deployed prior to exiting the aircraft. If the evacuee exits the aircraft too soon, they or others may not be fully supported by the platform and/or they may inhibit the proper deployment and/or inflation sequence of the evacuation slide. Examples disclosed herein include intuitive visual cues to notify the evacuee when the slide is not ready to use (i.e., unready) or ready to use. Thus, examples disclosed herein intuitively inform even untrained evacuees to not leave the aircraft before the slide is fully inflated. and, thus, reduce or eliminate the possibility of disrupting the proper inflation sequence of the slide.

Figure 1:
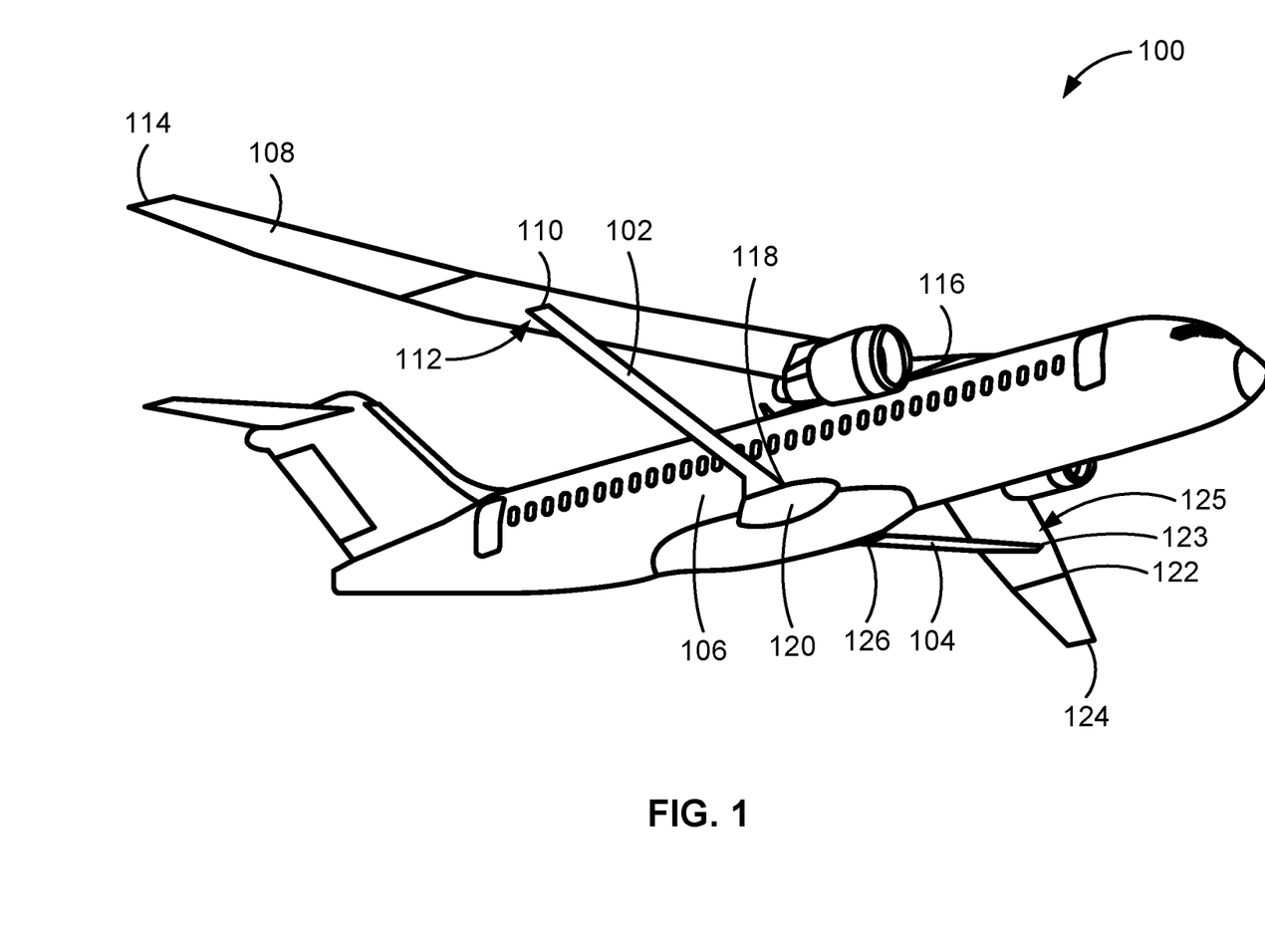
FIG. 1 illustrates an example aircraft that includes an example transonic truss-braced wing.

FIG. 1 illustrates an example aircraft 100 with transonic truss-braced wings. The aircraft 100 of the illustrated example includes a first example truss 102 and a second example truss 104. In some examples, the first truss 102 and the second truss 104 are referred to as stabilizers. Specifically, the first truss 102 of the illustrated example is coupled to a first wing 108 and the second truss 104 of the illustrated example is coupled to a second wing 122. The first and second trusses 102, 104 of the illustrated example limit movement of the respective first and second wings 108, 122 (e.g., reduce bending loads and flutter), thereby stabilizing the first and second wings 108, 122.

The aircraft 100 of the illustrated example includes a fuselage 106. The first wing 108 and the second wing 122 are coupled (e.g., attached) to the fuselage 106 via a fuselage connection 116 (e.g., a wing-to-fuselage structural attachment). In the illustrated example, a first end 110 of the first truss 102 is coupled to the first wing 108 at, or approximately at, a midpoint 112 (e.g., halfway) between a first wing tip 114 of the first wing 108 and the fuselage connection 116. While FIG. 1 illustrates the first end 110 coupled approximately to the midpoint 112 of the first wing 108, other attachment locations can be used instead. Further, a second end 118 of the first truss 102 of the illustrated example is coupled to the fuselage 106. In some examples, landing gear is housed within the second end 118. Thus, in some examples, the second end 118 includes a wider main landing gear pylon 120 to house the landing gear.

Likewise, the second truss 104 of the illustrated example is coupled to the fuselage 106 and the second wing 122. In some examples, a first end 123 of the second example truss 104 is coupled to the second example wing 122 at, or approximately at, a midpoint (e.g., halfway) 125 between a second wing tip 124 and the fuselage connection 116. In other instances, the first end 123 of the second truss 104 can be coupled to the second wing 122 at any location between the midpoint 125 and the wing tip 124. Further, a second end 126 of the second truss 104 is coupled to the fuselage 106. In some examples, the configuration of the first truss 102 to the first wing 108 and the fuselage 106 mirrors the configuration of the second truss 104 to the second wing 122 and the fuselage 106. In some examples, landing gear is housed within the second end 126. Thus, in some examples, the second end 126 includes a wider main landing gear pylon (e.g., similar to the landing gear pylon 120) to house the landing gear.

Figure 2:
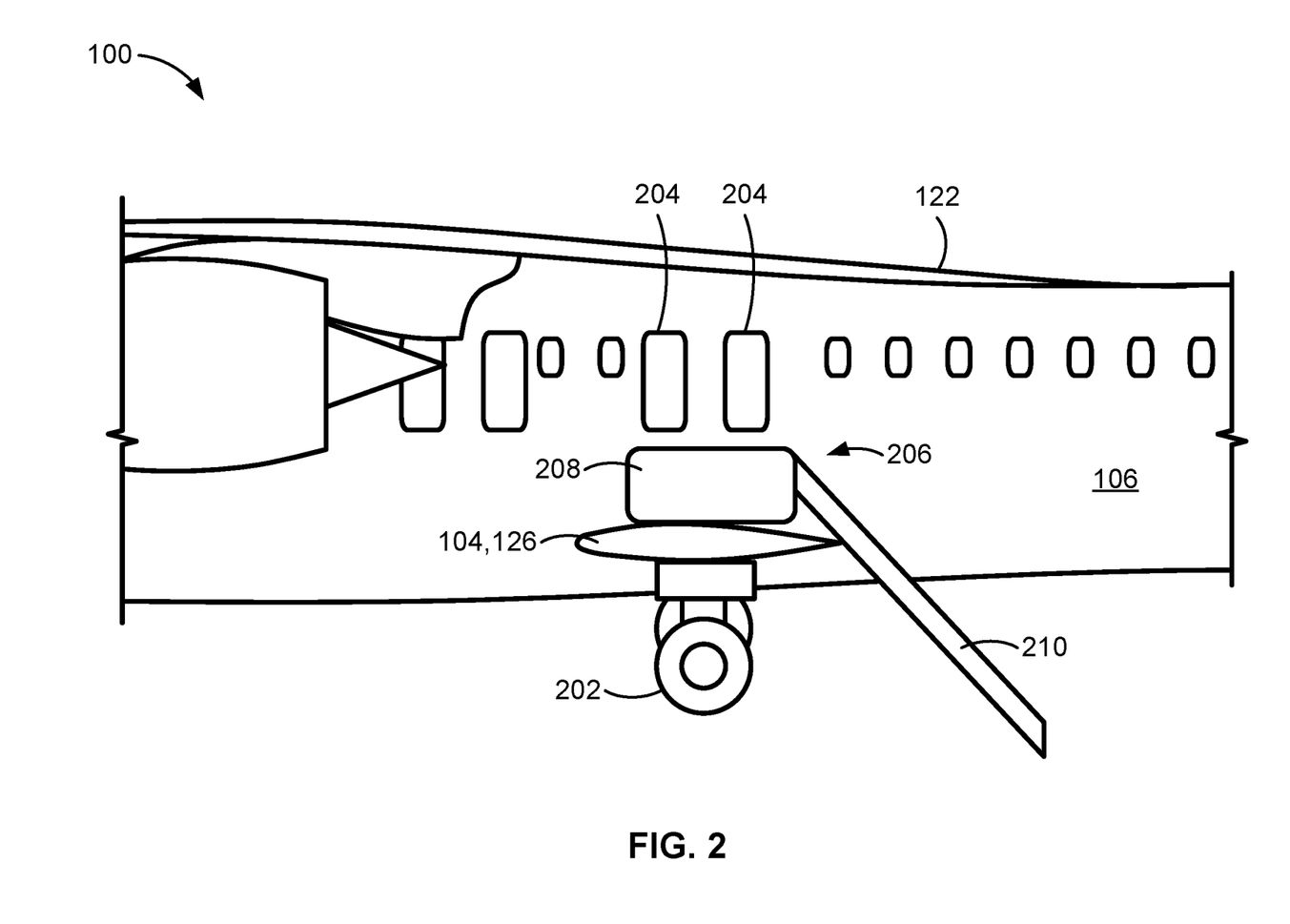
FIG. 2 illustrates a portion of the aircraft of FIG. 1 and an example evacuation slide.

FIG. 2 illustrates a portion of the aircraft 100 of FIG. 1 when landed with example wheels 202 deployed. The aircraft 100 includes example mid-cabin exit doors 204. In the illustrated example, there are two mid-cabin exit doors between the second wing 122 and the second end 126 of the second truss 104. In other examples, there may be only one exit door 204 at this location of the fuselage 106. Also, in some examples, there may be additional exit doors at other locations on the fuselage 106.

The example illustrated in FIG. 2 includes an example evacuation slide 206. The evacuation slide 206 may also be referred to as a deployable slide, an inflatable slide, an inflatable slide assembly, and/or an evacuation slide assembly. The evacuation slide 206 is positioned between the second wing 122 and the second end 126 of the second truss 104. In FIG. 2, the evacuation slide 206 is in the deployed position. In the deployed position, the evacuation slide 206 has been fully inflated. The evacuation slide 206 includes an example platform section 208 (or simply "platform" 208) and an example slide section 210. As such, the platform section 208 may be attached to the fuselage 106 in a suitable manner and may "rest upon" or be partially supported by the second end 126 of the second truss 104 to support the weight of the evacuation slide 206 and the evacuees thereon. In examples disclosed herein, the platform section 208 and the slide section 210 are inflatable. Therefore, in some examples, the platform section 208 may be referred to as an inflatable platform section, and the slide section 210 may be referred to as an inflatable slide section. Together, the platform section 208 and the slide section 210 form a slide body or inflatable slide body. The platform section 208 forms a first end of the evacuation slide 206 that is attached to the fuselage 106. In some examples, the platform 208 may be referred to as a porch, a ramp, or a lateral section. The platform 208 is positioned above the second truss 104, and may rest thereon when inflated. In the illustrated example, the second truss 104 has a tear shaped cross section. The top surface of the second truss 104 is curved and does not provide a flat, stable stepping surface or lateral area for movement of evacuees leaving the aircraft 100 from the exit door(s) 204. The platform 208 provides a flat, horizontal or otherwise relatively level surface above the second truss 104 to support the evacuee as the evacuee leaves the aircraft 100 and approaches the slide section 210. The slide section 210 forms a second end of the evacuation slide 206. The slide section 210 is used by evacuees to slide from the aircraft 100 down to the ground when the evacuation slide 206 is deployed.

The evacuation slide 206 includes air-tight assemblies. The assemblies are configured to receive gas from gas sources when the evacuation slide 206 is deployed. The evacuation slide 206 may be formed from a variety of suitable air-tight materials such as, for example, a lightweight fabric coated with an elastomer (e.g., urethane). The different parts of the evacuation slide 206 may be joined together with suitable adhesive and/or other fasteners or fastening techniques so that a unitary assembly is formed.

When the need to evacuate arises, typical airplane controls cause the evacuation slide 206 to be automatically deployed and inflated from a storage compartment when at least one of the exit doors 204 is opened. In some examples, one or more of the exit doors 204 may be further equipped with a manual backup system that is configured to deploy and inflate the evacuation slide 206. Additionally, the storage compartment may further contain an attachment point that couples the evacuation slide 206 to the fuselage 106. At deployment, the inflatable evacuation slide 206 may be inflated so that at least a portion of an upper surface of the platform 208 is proximate with sills of the exit doors 204. The exit doors 204 and evacuation slide 206 may be included in the aircraft 100 on the other side (e.g., the side shown in FIG. 1).

Examples disclosed herein include visual cues to notify the evacuee when the evacuation slide 206 is ready to use. Examples disclosed herein include example readiness gates that are visual gates or checkpoints. Different example readiness gates are shown in FIGS. 3A-5B. The readiness gates make an evacuee aware of whether the inflating evacuation slide 206 is ready or not ready (i.e., unready) for user egress from an aircraft onto the evacuation slide 206 during evacuation. In examples disclosed herein, the readiness gates may also be referred to as readiness indicator gates or gates. Also, in some examples, a visual indicator may be referred to more broadly as a readiness indicator. In some examples, readiness gates disclosed herein may be painted, stenciled, and/or otherwise marked to provide contrast to the surrounding slide fabric and high visibility to the evacuee.

The term "ready" as used herein means that some or all of the evacuation slide 206 is inflated sufficiently enough with sufficient air pressure for evacuees to use the slide 206, including walking on the platform section 208 and then sliding down the slide section 210 in a typical fashion to allow evacuation off and away from the airplane. The term "unready" as used herein means that some or all of the evacuation slide is not inflated with sufficient air pressure for evacuees to use the platform section 208 and/or the slide section 210.

Note that the evacuation slide 206 may inflate in stages, meaning that the platform section 208 may be caused to inflate first (or inflate faster) followed by inflation of the slide section 210. This may be achieved by valve control and/or due to the internal shape or baffles built into the internal chamber of the evacuation slide 206 in a suitable or typical manner. In its simplest manner, the slide section 210 may be the last section to fully inflate and/or be ready for use by virtue of being farther away from the compressed air source (on the airplane) than the platform section 208.

Figure 3A:
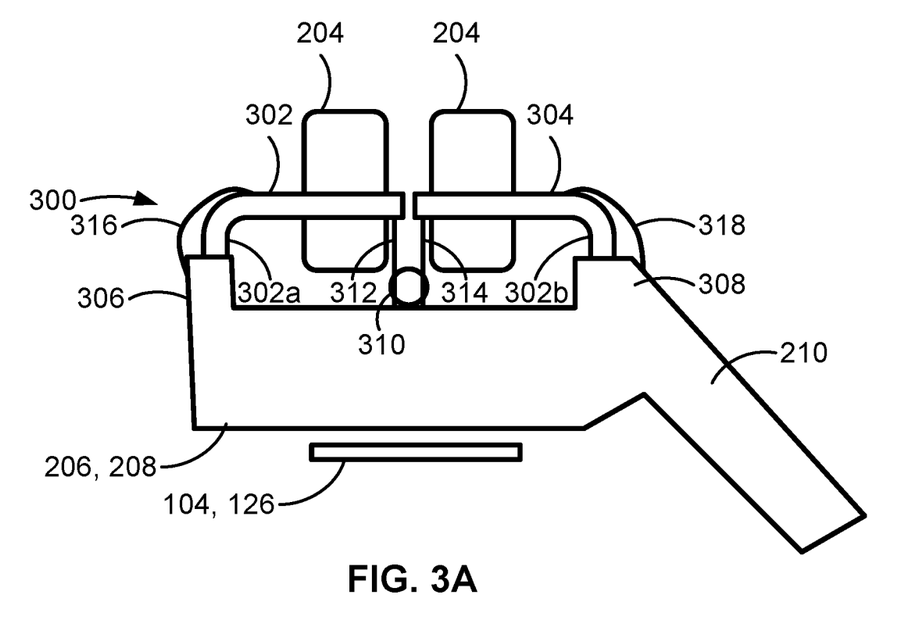
FIG. 3A illustrates an example first evacuation slide readiness gate in a first position.
Figure 3B:
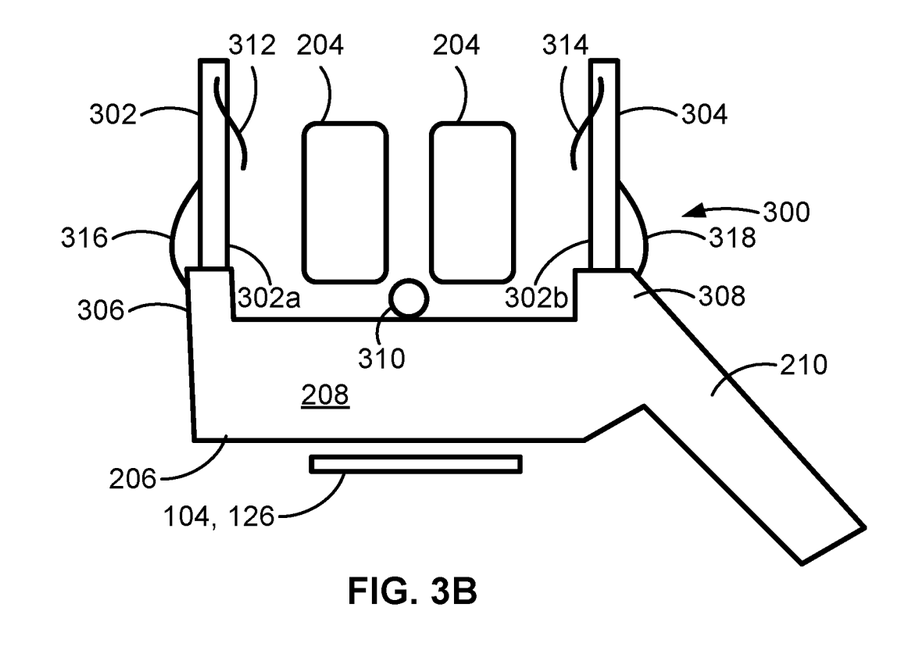
FIG. 3B illustrates the first evacuation slide readiness gate of FIG. 3A in a second position.

FIG. 3A illustrates an example first evacuation slide readiness gate 300 in a first position. In some examples, the first position is referred to as an unready position, in which the readiness gate 300 indicates that the inflatable slide body is not ready for use by evacuees. FIG. 3B illustrates the first evacuation slide readiness gate 300 of FIG. 3A in a second position. In some examples, the second position is referred to as a ready position, in which the readiness gate 300 indicates that the inflatable slide body is ready for use by evacuees. The readiness gate 300 is moveable from the first position in which the readiness gate 300 provides a visual cue (to evacuees standing in the airplane at the door 204) that deters access to the evacuation slide 206 and the second position in which the readiness gate 300 clears, permits, or opens access to the evacuation slide 206. In the first position, the readiness gate 300 provides a visual cue to evacuees inside the airplane that the platform or lateral section 208 and/or the evacuation slide 210 is not ready for use by an evacuee.

In some examples, the readiness gate 300 includes an example first arm 302 and an example second arm 304. In some examples, the first arm 302 and the second arm 304 are inflatable. Thus, in some examples, each of the first arm 302 and/or the second arm may be referred to as an inflatable arm. In other examples, the first arm 302 and the second 304 are made of a solid and flexible material such as, for example, foam. In the first position, ends of the first arm 302 and the second arm 304 are in proximity to each other such that the first arm 302 and the second arm 304 extend laterally along the platform section 208 and/or across the exit doors 204 to form a visual barrier across the exit doors 204. In some examples, the evacuation slide 206 includes example guardrails such as a first guardrail 306 and a second guardrail 308. The guardrails 306, 308 are portions of the evacuation slide 206 that inflate to a higher level than the platform 208. The guardrails 306, 308 are positioned at the outer perimeter of the evacuation slide 206. The guardrails 306, 308 do not obstruct egress over the evacuation slide 206. The guardrails 306, 308 ensure that the evacuees remain on the evacuation slide 206 until they have reached the ground. A first end 302a of the first arm 302 is coupled to the first guardrail 306. Similarly, a first end 302b of the second arm 304 is coupled to the second guardrail 308. In some examples, one or more of the first arm 302 and/or the second arm 304 are coupled directly to the platform 208.

The readiness gate 300 includes an example anchor release 310. In some examples, the anchor release 310 includes an inflatable body. In some examples, the inflatable body includes expandable fabric body. In this example, the anchor release 310 is coupled to the platform 208. In some examples, the anchor release 310 is contained within another inflatable slide feature, such as for example, the platform 208 and/or other portion of the evacuation slide 206. For example, the anchor release 310 may be a chambered and/or orificed portion of the platform 208 and/or other portion of the evacuation slide 206 that is to inflate last. An example first tether 312 releasably couples the second end of the first arm 302 to the anchor release 310. Similarly an example second tether 314 releasably couples the second end of the second arm 304 to the anchor release 310. The first tether 312 and the second tether 314 respectively hold the first arm 302 and the second arm 304 in the first position so that the first arm 302 and the second arm 304 are positioned horizontally across the exit doors 204 and over the platform 208. In some examples, the anchor release 310 may be coupled to the slide section 210 distal to the platform section 208 (i.e., close to a ground contact portion of the slide section 210). In such examples, the first tether 312 and the second tether 314 may include relatively longer umbilical lanyards or cords that extend from the first arm 302 and the second arm 304 to the anchor release 310 positioned at the distal end of the slide section 208.

The anchor release 310 is the last to inflate portion of the evacuation slide 206. Thus, in some examples, the anchor release is configured to inflate in response to inflation of the inflatable slide body (the platform 208 and the slide section 210). In some examples, the first arm 302 and the second arm 304 are the first to inflate portions of the evacuation slide 206. The platform 208 and the slide section 210 may be inflated simultaneously with the first arm 302 and the second arm 304 and, in any event, before the anchor release 310. In some examples, deployment (i.e., inflation) of the evacuation slide 206 occurs within ten seconds. In some examples, inflation of the evacuation slide 206 occurs with four to six seconds. In other examples, the evacuation slide 206 inflates within other time frames.

In some examples, the inflation sequence would be as follows: the platform section 208 closest to the fuselage (e.g., a main trunk/support tube manifolded to the rest of the platform section 208) and simultaneously the first arm 302 and the second arm 304 would inflate first. The first arm 302 and the second arm 304 have a smaller volume than the platform section 208 so the first arm 302 and the second arm 304 would erect in the inflated position first while the rest of the platform section 208 fills with air. The guard rails 308 begin to inflate as the platforms section 209 inflates. In examples where the first arm 302 and the second arm 304 are orificed to the guard rails 308, the guard rails 208 would inflate first to immediately support the inflation of the first arm 302 and the second arm 304. When the platform section 208 is nearly filled with air or other gas, the slide section 210 fills next in a controlled manner (e.g., based in internal orifices, fabric bulkheads, etc.). After the slide section 210 is fully formed, the anchor release 310 is filled.

Inflation of the anchor release 310 occurs when the evacuation slide 206 is ready for use. The anchor release 310 can either have a very small orifice connected to the platform section 208 such that the anchor release 310 is engineered to fill slowly in the time it takes the platform section 208 and the slide section 210 to fully inflate. Alternatively, the anchor release 10 can have a discrete communication path (e.g. hose, internal baffle/bulkhead, orifice, etc.) from the slide section 210. In this example, as the gas fills the slide section 210, the gas will flow from the slide section 210 to the anchor release 310 as the last feature.

When the anchor release 310 is inflated, the connection of the first tether 312 and the second tether 314 to the anchor release 310 is disengaged. The first arm 302 and the second arm 304 are, therefore, untethered from the anchor release 310. For example, the anchor release 310 may be an inflatable spherical structure that creates tension on the tethers 312, 314 as the anchor release 310 expands until the tension releases the anchor connection with the tethers 312, 314. In some examples, the first tether 312 and the second tether 314 are coupled to the anchor release 310 via hook and loop fasteners (e.g., Velcro), which are disengaged as the anchor release 310 expands. In some examples, the first tether 312 and the second tether 314 are coupled to the anchor release 310 via a quick release knot that is unraveled as the anchor release 310 expands. In some examples, the first tether 312 and the second tether 314 are coupled to the anchor release 310 via overlapping fabric releasably held with a chute pin. In some examples, the first tether 312 and the second tether 314 are coupled to the anchor release 310 via a releasable adhesive that is peeled away as the anchor release 310 expands. In other examples, other releasable mechanical or chemical fasteners may be used to couple the first tether 312 and the second tether 314 to the anchor release 310. When the first tether 312 and the second tether 314 are disengaged from the anchor release 310, the readiness gate 300 is able to move to the ready position (the second position shown in FIG. 3B).

The first arm 302 and the second arm 304 move from the first position of FIG. 3A to the second position of FIG. 3B. In the second position of FIG. 3B, the first arm 302 and the second arm 304 are cleared away from the exit doors 204, which visually signals to the evacuees that the evacuation slide 206 is available or ready for use. In the second position, the first arm 302 extends from its first end vertically or upward from the first guardrail 306, and the second arm 304 extends from its first end vertically or upward from the second guardrail 308. In the second position, the first tether 312 remains attached to the second end of the first arm 302, and the second tether 314 remains attached to the second end of the second arm 304 so that the first tether 312 and the second tether 314 do not form trip hazards for evacuees exiting the aircraft 100.

In some examples, the material of the first arm 302 and the second arm 304 cause the first arm 302 and the second arm 304 to spring into the second position of FIG. 3B when untethered from the anchor release 310. In some examples, the evacuation slide 206 includes a first assist strap 316 coupled to the first arm 302 and the first guardrail 306 and a second assist strap 318 coupled to the second arm 304 and the second guardrail 308. In some examples, there is only one assist strap. In some examples, the first assist strap 316 and the second assist strap 318 include elastic cords. The first assist strap 316 pulls against the first tether 312 when the first tether 312 is coupled to the anchor release 310 in the first position of FIG. 3A. Similarly, the second assist strap 318 pulls against the second tether 314 when the second tether 314 is coupled to the anchor release 310 in the first position of FIG. 3A. When the anchor release 310 expands and releases the first tether 312 and the second tether 314, the first assist strap 316 pulls or otherwise aids movement of the first arm 302 into the second position of FIG. 3B, and the second assist strap 318 pulls or otherwise aids movement the second arm 304 into the second position of FIG. 3B. The first assist strap 316 and the second assist strap 318 facilitate and, in some examples, hasten the transition of the readiness gate 300 from the first position of FIG. 3A to the second position of FIG. 3B. In some examples, the first assist strap 316 and the second assist strap 318 operate to ensure that the first arm 302 and the second arm 304 are fully withdrawn away from the exit doors 204. Note that the readiness gate(s) disclosed herein is/are not designed to be strong enough that evacuees could not push their way past the gate(s) when in the unready position if it were necessary to evacuate the airplane. Rather, the gate(s) merely act as a visual indicator of the status of the slide (i.e., ready or unready for use).

Figure 4A:
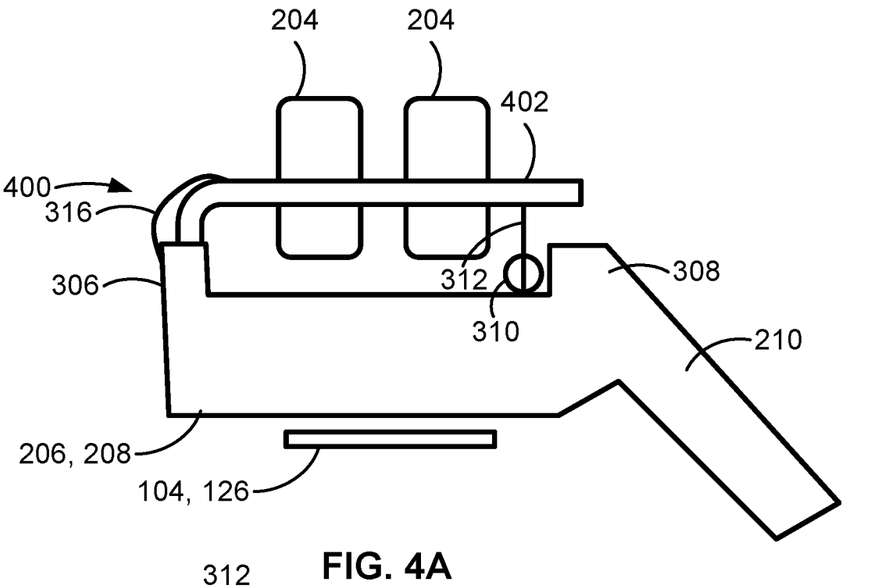
FIG. 4A illustrates an example second evacuation slide readiness gate in a first position.
Figure 4B:
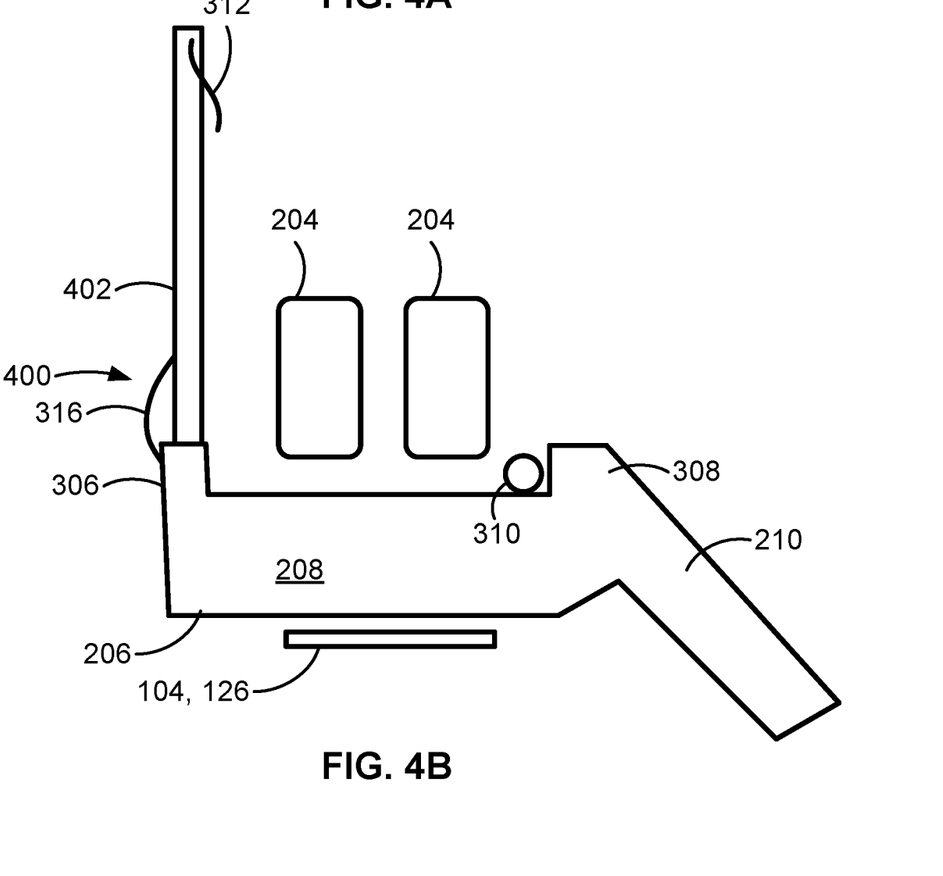
FIG. 4B illustrates the second evacuation slide readiness gate of FIG. 4A in a second position.

FIG. 4A illustrates an example second evacuation slide readiness gate 400 in a first position (e.g., an unready position). FIG. 4B illustrates the second evacuation slide readiness gate 400 of FIG. 4A in a second position (e.g., a ready position). The readiness gate 400 is similar to the readiness gate 300 except the readiness gate 400 includes a single arm 402. In some examples, the arm 402 may be an elongated arm to extend across multiple exit doors 204. In some examples, the arm 402 is dimensioned to extend across one exit door 204. The remaining structure and operation of the readiness gate 400 are similar as that disclosed above in connection with FIGS. 3A and 3B. However, the anchor release 310 in the readiness gate 400 is positioned closer to the second guardrail 308 than in the readiness gate 300. The anchor release 310 in the readiness gate 400 is positioned closer to the second guardrail 308 so that the end of the arm 402 is coupled via the first tether 312 to the anchor release 310 at a position that causes the arm 402 to extend across the platform 208 and the exit doors 204. In some examples, the first tether 312 may be attached mid-span of the single arm 402. In some examples, the first tether 312 may be located between the two exit doors 204. In the illustrated example, the anchor release 310 is coupled to the platform 208. In some examples, the anchor release 310 is coupled to the second guardrail 308.

Figure 5A:
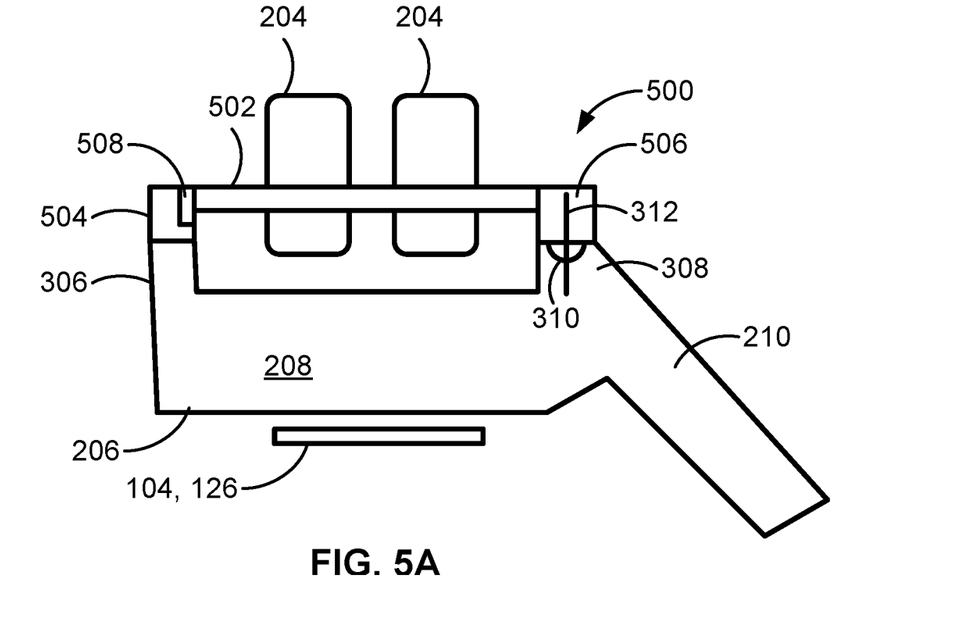
FIG. 5A illustrates an example third evacuation slide readiness gate in a first position.
Figure 5B:
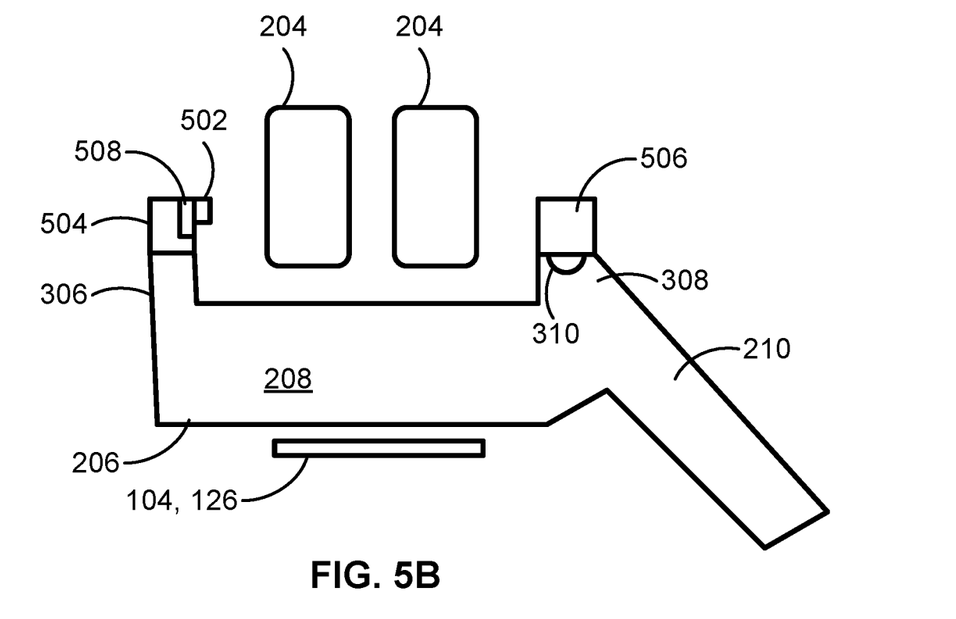
FIG. 5B illustrates the third evacuation slide readiness gate of FIG. 5A in a second position.

FIG. 5A illustrates an example third evacuation slide readiness gate 500 in a first position (e.g., an unready position). FIG. 5B illustrates the third evacuation slide readiness gate 500 of FIG. 5A in a second position (e.g., a ready position). The readiness gate 500 includes an example webbing 502. In some examples, the webbing 502 is a fabric material. In the position of FIG. 5A, the webbing 502 extends across the exit doors 204 while the evacuation slide 206 inflates. As shown in FIG. 5A, the webbing 502 extends from a housing 504 coupled to the first guardrail 306 to the tether 312. In this example, the tether 312 is coupled to a support plate 506. The support plate 506 is positioned on the second guardrail 308. The tether 312 is coupled to the anchor release 310 as noted above.

In other examples, the webbing 502 is coupled directly to the anchor release 310 without the tether 312 or support plate 506. In such examples, the webbing 502 is releasably coupled to the anchor release 310 in a manner similar to the coupling of the tether 312 and the anchor release 310 disclosed above.

When the anchor release 310 is inflated, the engagement between the anchor release 310 and the tether 312 (or the anchor release 310 and the webbing 502 directly) is lost. A retraction device 508 pulls or coils the webbing 502 into the housing 504. In some examples, the retraction device 508 includes an internal spring mechanism and the webbing 502 includes a retractable belt.

In the illustrated example, the anchor release 310 is coupled to the second guardrail 308. In some examples, the anchor release 310 is coupled to the platform 208.

In examples disclosed herein, the connections at the tethers 312, 314 may be configured so that the tethers 312, 314 are easily released. Thus, external forces (e.g., from evacuees) can trip the anchor connection between the tethers 312, 314 and the anchor release 310. This enables evacuees to move or bypass the readiness gate 300, 400, 500. For example, depending on the environment in the aircraft 100, an evacuee may want to apply a force release the tethers 312, 314 force to the arms 302, 304, 402 or webbing 502 before the readiness gate 300, 400, 500 indicates that the evacuation slide 206 is fully inflated. Thus, the readiness gate 300, 400, 500 forms a semi-rigid and/or semi-restrictive barrier, meaning that an evacuee can overcome the gate(s) and evacuate from the airplane at any time during an evacuation event despite the readiness of the slide.

Although the illustrated aircraft 100 is a transonic truss-braced wing aircraft, the examples disclosed herein may be used with other commercial passenger aircraft (e.g., a 737MAX) and other types of cargo aircraft, rotary aircraft, etc. Examples disclosed herein also may be used with other exits of aircraft in which a portion of a slide assembly can deploy from above a wing or truss and/or be supported thereon.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

Example aircraft and aircraft evacuation slides and related methods are disclosed herein. Example 1 includes an evacuation slide assembly for an aircraft, the evacuation slide assembly comprising, an inflatable slide body attachable to the aircraft and configured to inflate in response to an evacuation event, and a readiness indicator gate supported by the inflatable slide body, wherein the readiness indicator gate is movable from an unready position during inflation of the inflatable slide body, thereby indicating the inflatable slide body is not ready for use, to a ready position thereby indicating readiness of the inflatable slide body for user egress from the aircraft onto the inflatable slide body.

Example 2 includes the evacuation slide assembly of Example 1, wherein the readiness indicator gate includes a first inflatable arm and a second inflatable arm.

Example 3 includes the evacuation slide assembly of Example 2, further including an anchor release, a first tether releasably coupling the first inflatable arm to the anchor release, and a second tether releasably coupling the second inflatable arm to the anchor release.

Example 4 includes the evacuation slide assembly of Example 3, wherein the anchor release comprises an inflatable body configured to inflate, in response to inflation of the inflatable slide body, to disengage the first tether and the second tether from the anchor release to enable the readiness indicator gate to move to the ready position.

Example 5 includes the evacuation slide assembly of Example 3, further including a first assist strap coupled between the first inflatable arm and the inflatable slide body, and a second assist strap coupled between the second inflatable arm and the inflatable slide body, the first assist strap and the second assist strap to aid movement of the readiness indicator gate to the ready position.

Example 6 includes the evacuation slide assembly of Example 1, further including an anchor release configured to inflate, and a tether coupled to the readiness indicator gate and to the anchor release, the tether configured to disengage from the anchor release in response to inflation of the anchor release to enable the readiness indicator gate to move to the ready position.

Example 7 includes the evacuation slide assembly of Example 1, wherein the readiness indicator gate is configured to extend upwardly when the readiness indicator gate is in the ready position.

Example 8 includes the evacuation slide assembly of Example 1, further including an assist strap coupled between the readiness indicator gate and the inflatable slide body to aid movement of the readiness indicator gate to the ready position.

Example 9 includes the evacuation slide assembly of Example 1, further including an anchor release coupled to the readiness indicator gate, wherein the readiness indicator gate is configured to move to the ready position in response to inflation of the anchor release.

Example 10 includes the evacuation slide assembly of Example 1, wherein the inflatable slide body comprises an inflatable platform section and an inflatable slide section, the inflatable platform section configured to deploy from a fuselage of the aircraft above a truss and below an exit door of the aircraft, wherein the readiness indicator gate is supported by the inflatable platform section and is configured to deploy proximate the exit door during inflation of the inflatable platform section.

Example 11 includes an evacuation slide assembly for an aircraft, the evacuation slide assembly includes an inflatable platform section, an inflatable slide section coupled to the inflatable platform section, a readiness indicator gate coupled to the inflatable platform section, and an anchor release coupled to the readiness indicator gate and configured to cause the readiness indicator gate to move from an unready position to a ready position in response to inflation of the inflatable slide section.

Example 12 includes the evacuation slide assembly of Example 11, wherein the readiness indicator gate includes an inflatable arm.

Example 13 includes the evacuation slide assembly of Example 11, wherein the readiness indicator gate includes a retractable webbing.

Example 14 includes the evacuation slide assembly of Example 11, wherein the anchor release comprises an inflatable body configured to inflate after inflation of the inflatable platform section and the inflatable slide section.

Example 15 includes the evacuation slide assembly of Example 11, wherein the readiness indicator gate is configured to extend laterally along the inflatable platform section in the unready position, and configured to extend upwardly relative to the inflatable platform section in the ready position thereby indicating readiness of the inflatable slide section for user egress from the aircraft onto the inflatable platform section.

Example 16 includes the evacuation slide assembly of Example 11, further comprising a tether coupling together the readiness indicator gate and the anchor release when in the unready position, wherein the anchor release is configured to inflate to release the tether to aid the readiness indicator gate to move to the ready position.

Example 17 includes an aircraft that includes a fuselage having at least one exit door, a wing attached to the fuselage, a truss coupled to the wing and the fuselage, and an inflatable slide assembly attached to the fuselage and comprising a readiness indicator, wherein the inflatable slide assembly is deployable above the truss and below the at least one exit door.

Example 18 includes the aircraft of Example 17, wherein the readiness indicator comprises a gate operable in response to inflation of the inflatable slide assembly, the gate configured to extend along the at least one exit door when the readiness indicator is in an unready position, thereby indicating the inflatable slide assembly is not ready for passenger egress from the at least one exit door.

Example 19 includes the aircraft of Example 17, wherein the inflatable slide assembly comprises a platform section and a slide section, wherein the platform section is configured to support the readiness indicator and is configured to inflate above the truss and be supported by the truss when inflated, and wherein the slide section is configured to inflate from a side of the platform section and towards the ground.

Example 20 includes the aircraft of Example 19, wherein the inflatable slide assembly comprises an anchor release and a tether, the tether coupled between the platform section and the readiness indicator, wherein the anchor release is configured to inflate and release the tether to enable the readiness indicator to move from an unready position to a ready position in response to inflation of the inflatable slide assembly.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An evacuation slide assembly for an aircraft, the evacuation slide assembly comprising:
    an inflatable platform section;
    an inflatable slide section coupled to the inflatable platform section;
    a readiness indicator gate coupled to the inflatable platform section, the readiness indicator gate including a retractable webbing; and
    an anchor release coupled to the readiness indicator gate and configured to cause the readiness indicator gate to move from an unready position to a ready position in response to inflation of the inflatable slide section.

2. An evacuation slide assembly for an aircraft, the evacuation slide assembly comprising:
    an inflatable platform section;
    an inflatable slide section coupled to the inflatable platform section;
    a readiness indicator gate coupled to the inflatable platform section; and
    an anchor release coupled to the readiness indicator gate and configured to cause the readiness indicator gate to move from an unready position to a ready position in response to inflation of the inflatable slide section, wherein the anchor release comprises an inflatable body configured to inflate after inflation of the inflatable platform section and the inflatable slide section.

3. The evacuation slide assembly of claim 2, wherein the readiness indicator gate is configured to extend laterally along the inflatable platform section in the unready position, and configured to extend upwardly relative to the inflatable platform section in the ready position thereby indicating readiness of the inflatable slide section for user egress from the aircraft onto the inflatable platform section.

4. The evacuation slide assembly of claim 2, further comprising a tether coupling together the readiness indicator gate and the anchor release when in the unready position, wherein the anchor release is configured to inflate to release the tether to aid the readiness indicator gate to move to the ready position.

5. The evacuation slide assembly of claim 2, wherein the unready position indicates that the inflatable slide section is not ready for use, and the ready position indicates readiness of the inflatable slide section body for user egress from the aircraft onto the inflatable slide section.

6. The evacuation slide assembly of claim 2, wherein the readiness indicator gate includes a first inflatable arm and a second inflatable arm.

7. The evacuation slide assembly of claim 2, further including:
    a first tether releasably coupling the first inflatable arm to the anchor release; and
    a second tether releasably coupling the second inflatable arm to the anchor release.

8. The evacuation slide assembly of claim 7, wherein the anchor release comprises an inflatable body configured to inflate, in response to inflation of the inflatable slide section, to disengage the first tether and the second tether from the anchor release to enable the readiness indicator gate to move to the ready position.

9. The evacuation slide assembly of claim 2, further including:
    a first assist strap; and a second assist strap, the first assist strap and the second assist strap to aid movement of the readiness indicator gate to the ready position.

10. The evacuation slide assembly of claim 2, further including a tether coupled to the readiness indicator gate and to the anchor release, the tether configured to disengage from the anchor release in response to inflation of the anchor release to enable the readiness indicator gate to move to the ready position.

11. The evacuation slide assembly of claim 2, wherein the readiness indicator gate is configured to extend upwardly when the readiness indicator gate is in the ready position.

12. The evacuation slide assembly of claim 2, further including an assist strap to aid movement of the readiness indicator gate to the ready position.

13. The evacuation slide assembly of claim 2, wherein the inflatable platform section is configured to deploy from a fuselage of the aircraft above a truss and below an exit door of the aircraft, wherein the readiness indicator gate is configured to deploy proximate the exit door during inflation of the inflatable platform section.

14. The evacuation slide assembly of claim 2, wherein the readiness indicator gate includes an inflatable arm.

15. An aircraft comprising:
a fuselage having at least one exit door;
a wing attached to the fuselage;
a truss coupled to the wing and the fuselage; and
an inflatable slide assembly attached to the fuselage and comprising a readiness indicator, wherein the inflatable slide assembly is deployable above the truss and below the at least one exit door.

16. The aircraft of claim 15, wherein the readiness indicator comprises a gate operable in response to inflation of the inflatable slide assembly, the gate configured to extend along the at least one exit door when the readiness indicator is in an unready position, thereby indicating the inflatable slide assembly is not ready for passenger egress from the at least one exit door.

17. The aircraft of claim 15, wherein the inflatable slide assembly comprises a platform section and a slide section, wherein the platform section is configured to support the readiness indicator and is configured to inflate above the truss and be supported by the truss when inflated, and wherein the slide section is configured to inflate from a side of the platform section and towards the ground.

18. The aircraft of claim 17, wherein the inflatable slide assembly comprises an anchor release and a tether, the tether coupled between the platform section and the readiness indicator, wherein the anchor release is configured to inflate and release the tether to enable the readiness indicator to move from an unready position to a ready position in response to inflation of the inflatable slide assembly.

* * * * *